(No Model.) 2 Sheets—Sheet 1.

A. J. HOYT.
GEARING.

No. 507,681. Patented Oct. 31, 1893.

Witnesses:
Alex. Barkoff
Murray C. Boyer

Inventor:
Andrew J. Hoyt
by his Attorneys (No Model.) 2 Sheets—Sheet 2.

A. J. HOYT.
GEARING.

No. 507,681. Patented Oct. 31, 1893.

Witnesses:
Alex. Barkoff
Murray C. Boyer

Inventor:
Andrew J. Hoyt
by his Attorneys
Howson & Howson

UNITED STATES PATENT OFFICE.

ANDREW J. HOYT, OF PHILADELPHIA, PENNSYLVANIA.

GEARING.

SPECIFICATION forming part of Letters Patent No. 507,681, dated October 31, 1893.

Application filed December 14, 1892. Serial No. 455,192. (No model.)

*To all whom it may concern:*

Be it known that I, ANDREW J. HOYT, a citizen of the United States, and a resident of Philadelphia, Pennsylvania, have invented an Improved Form of Gearing for Machinery, of which the following is a specification.

The object of my invention is to so construct gearing for transmitting the power of one shaft to another that there will be a minimum of friction between the engaging members of the gearing, and this object I attain in the manner hereinafter set forth, reference being had to the accompanying drawings, in which—

Figure 1:
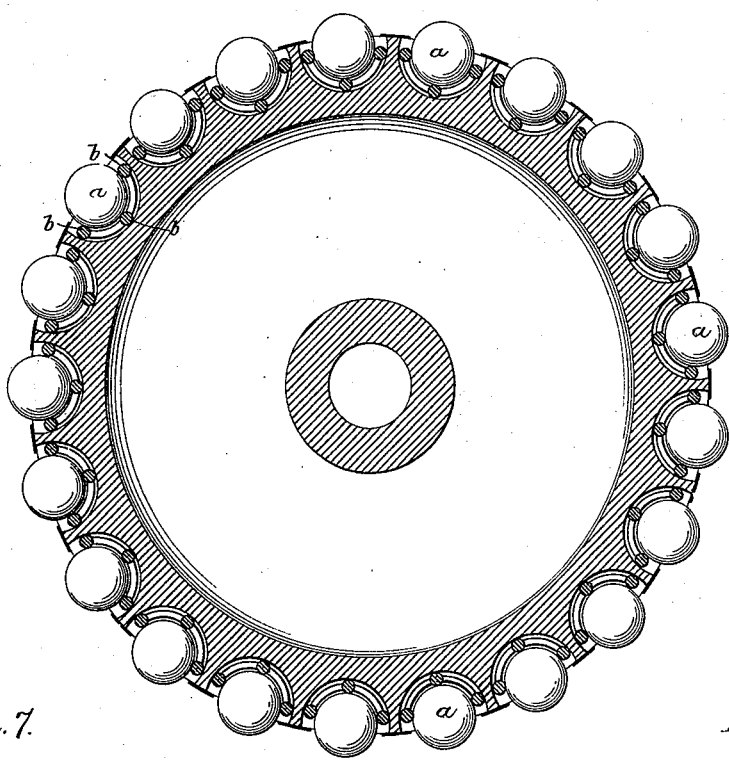
Figure 7:
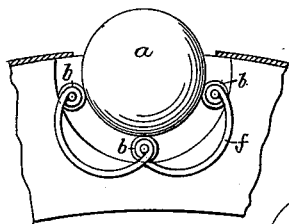
Figure 2:
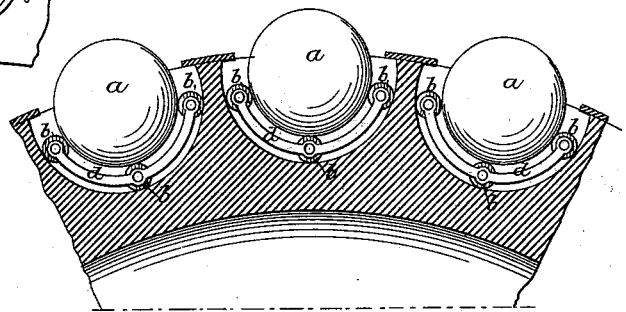
Figure 3:
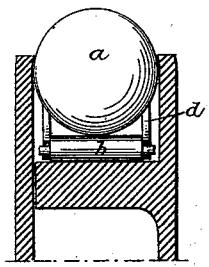
Figure 4:
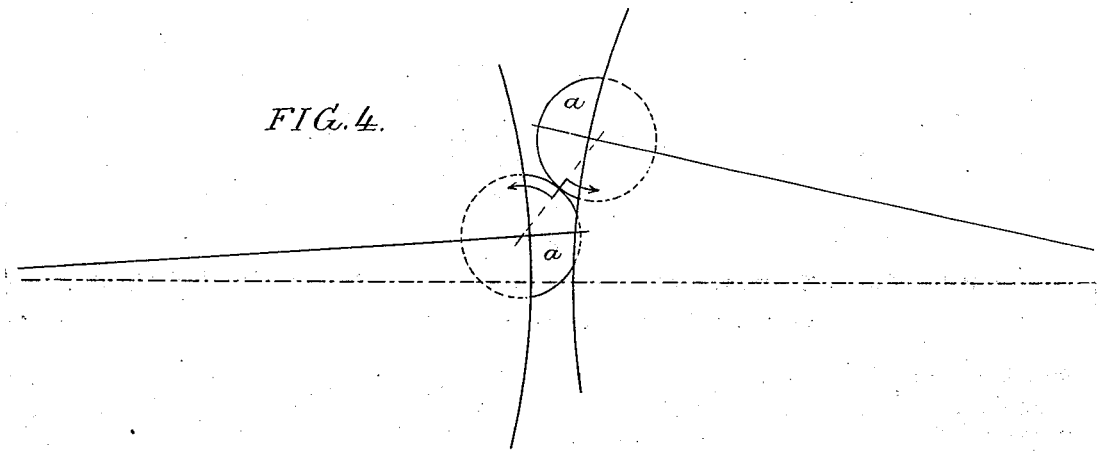
Figure 5:
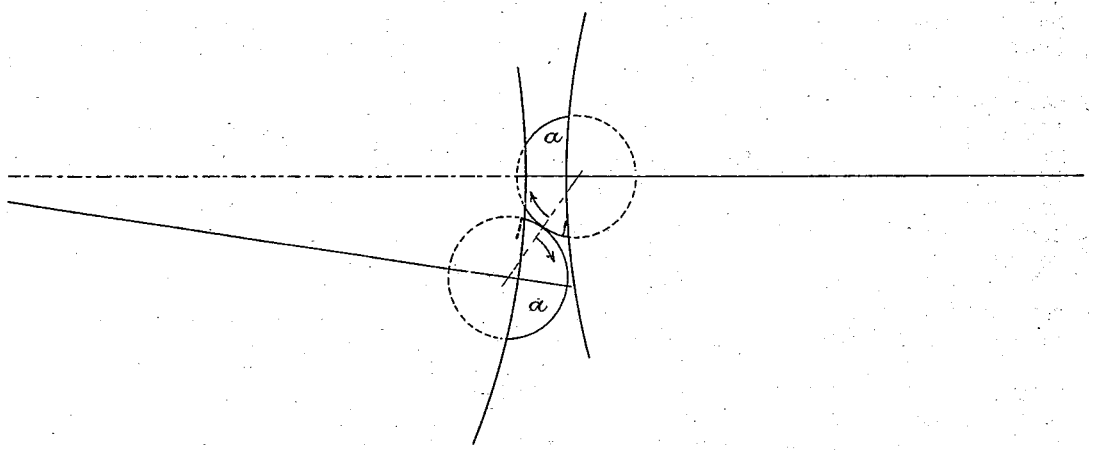
Figure 6:
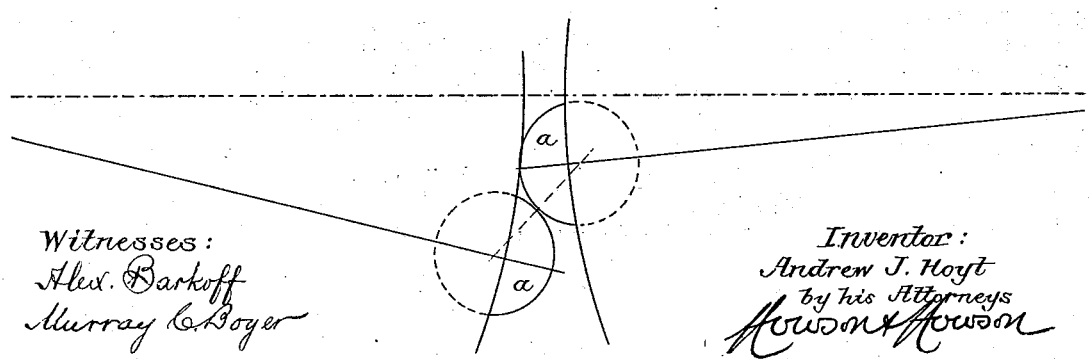

Figure 1, is a sectional view of a gear wheel constructed in accordance with my invention. Fig. 2, is an enlarged section of a part of the same. Fig. 3, is a transverse section, partly in elevation. Figs. 4, 5 and 6, are diagrams illustrating the engaging parts of a pair of such gear wheels; and Figs. 7 and 8, are views representing modifications of the invention.

Each of the gear wheels consists of a rim connected to the hub of the wheel by spokes, plates, or in any available manner and having formed in it a series of recesses for the reception of a succession of balls $a$, one part of the rim being detachable laterally, as shown in Fig. 3, for instance, so as to provide for the insertion or withdrawal of the balls as required. Each ball is prevented from escaping radially from its recess by reason of the fact that the rim of the wheel slightly overlaps the ball, as shown in Fig. 3, and each of said balls has its inner bearing upon a series of antifriction rollers $b$ which may turn in suitable bearings in the rim, but which are preferably adapted to run upon the concave bases of the recesses formed in the rim for the reception of the balls, these rollers being preferably reduced at the ends and said reduced ends being connected by a light frame $d$ as shown in Fig. 2, or by a spring $f$ as shown in Fig. 7, or in some other available manner, the rollers being prevented from leaving the recesses by suitable overlapping or overhanging flanges upon the rim, as shown. When a ball of one wheel comes in contact with a ball of the other wheel as shown in Fig. 4, continued movement of the wheel causes movement of the balls in the direction of the arrows Fig. 4, until the mid-position shown in Fig. 5, is reached, whereupon the direction of movement is changed until the balls pass from contact with each other, as shown in Fig. 6. It will therefore be seen that there is but a slight rocking of each ball at each contact, so that the antifriction rollers move to and fro to a slight extent in the pockets of the wheel rim and the power is transmitted from one wheel to the other with the least possible amount of friction.

Figure 8:
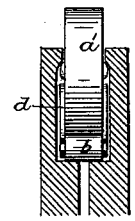

Instead of using balls as the engaging elements of the different members of the gearing, rollers $a'$ may be employed if desired, without altering the character of the invention, one method of using such rollers being represented in Fig. 8.

A gear wheel having as its contact elements balls or rollers with antifriction bearings may also be used in connection with a wheel having fixed projections corresponding with said balls or rollers, without departing from the main features of my invention.

Having thus described my invention, I claim and desire to secure by Letters Patent—

A gear wheel having contact elements mounted upon connected series of rollers running upon ways in the rim of the wheel, substantially as specified.

In testimony whereof I have signed my name to this specification in the presence of two subscribing witnesses.

ANDREW J. HOYT.

Witnesses:
FRANK E. BECHTOLD,
JOSEPH H. KLEIN.